United States Patent [19]
Komaki

[11] 3,809,516
[45] May 7, 1974

[54] APPARATUS FOR MANUFACTURING A LIGHT-WEIGHT CONCRETE PANEL WITH PATTERN DESIGNS ON ITS SURFACE

[76] Inventor: Saiji Komaki, No. 1, Nagayoshi-cho, Kagoshima-shi, Japan

[22] Filed: Dec. 8, 1971

[21] Appl. No.: 205,819

[30] Foreign Application Priority Data
| Mar. 30, 1971 | Japan | 46-18868 |
| Mar. 30, 1971 | Japan | 46-18869 |
| May 21, 1971 | Japan | 46-34547 |
| Sept. 10, 1971 | Japan | 46-70250 |
| Dec. 31, 1970 | Japan | 45-134896 |

[52] U.S. Cl. ............ 425/150, 425/166, 425/259, 425/375, 425/811
[51] Int. Cl. .............. B28b 17/00, B05b 7/08
[58] Field of Search .......... 425/120, 150, 163, 166, 425/811, 130, 131, 134, 256, 259, 375, 453, 457; 266/23 F

[56] References Cited
UNITED STATES PATENTS
| 3,677,681 | 7/1972 | Zippel | 425/375 |
| 2,934,808 | 5/1960 | Wilson | 425/134 |
| 3,659,986 | 5/1972 | Gelbman | 425/454 |
| 3,425,105 | 2/1969 | Gulde | 425/130 |
| 3,296,675 | 1/1967 | Filangeri | 425/130 |
| 3,570,056 | 3/1971 | Hall et al. | 425/163 X |

FOREIGN PATENTS OR APPLICATIONS
| 2,448 | 2/1901 | Great Britain | 425/375 |

Primary Examiner—Robert D. Baldwin
Assistant Examiner—John McQuane
Attorney, Agent, or Firm—McGlew and Tuttle

[57] ABSTRACT

A light-weight concrete panel, with patterns on its surface, is produced automatically by positioning a mold in operative relation with materail supply devices including a device for supplying a pattern material, a device for directing air against an applied pattern and a device for applying concrete into the mold. The device for applying the pattern material, and movement of the mold, are controlled by scanning of a master pattern. The pattern material may be dies. The supply devices, including troughs, material feeders, and discharge spouts are mounted on horizontal arms extending from an upright pillar, and the pillar may be rotatable to position the several supply devices in operative relation with the mold.

3 Claims, 24 Drawing Figures

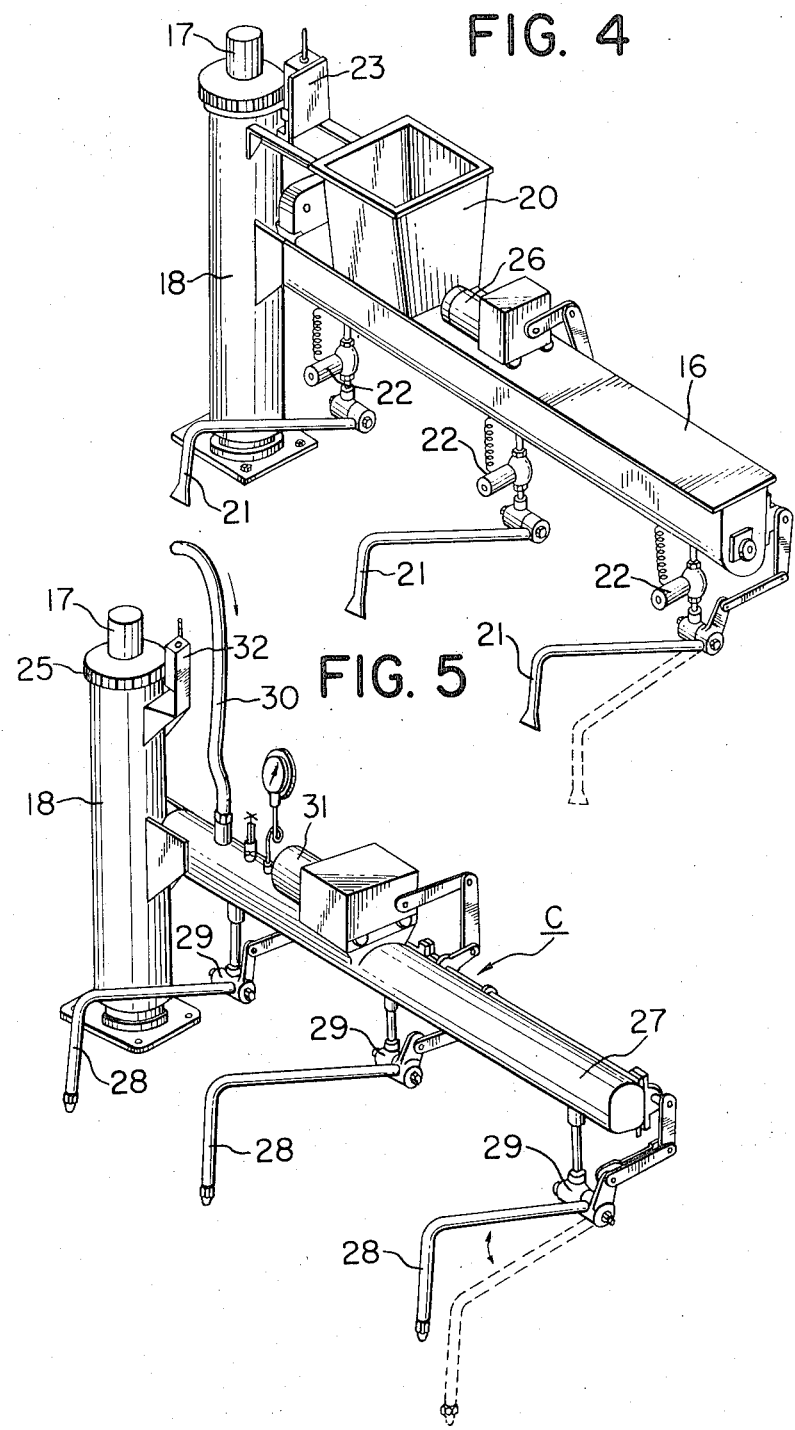

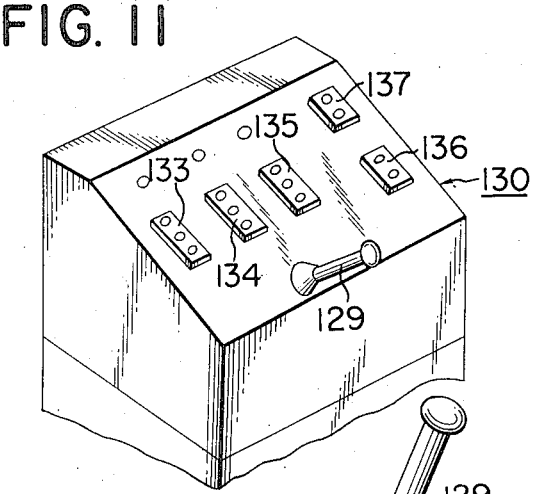
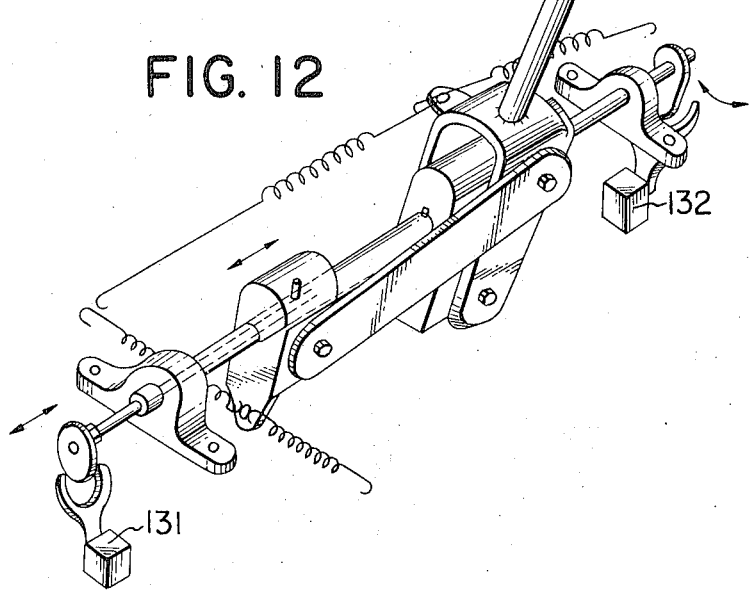

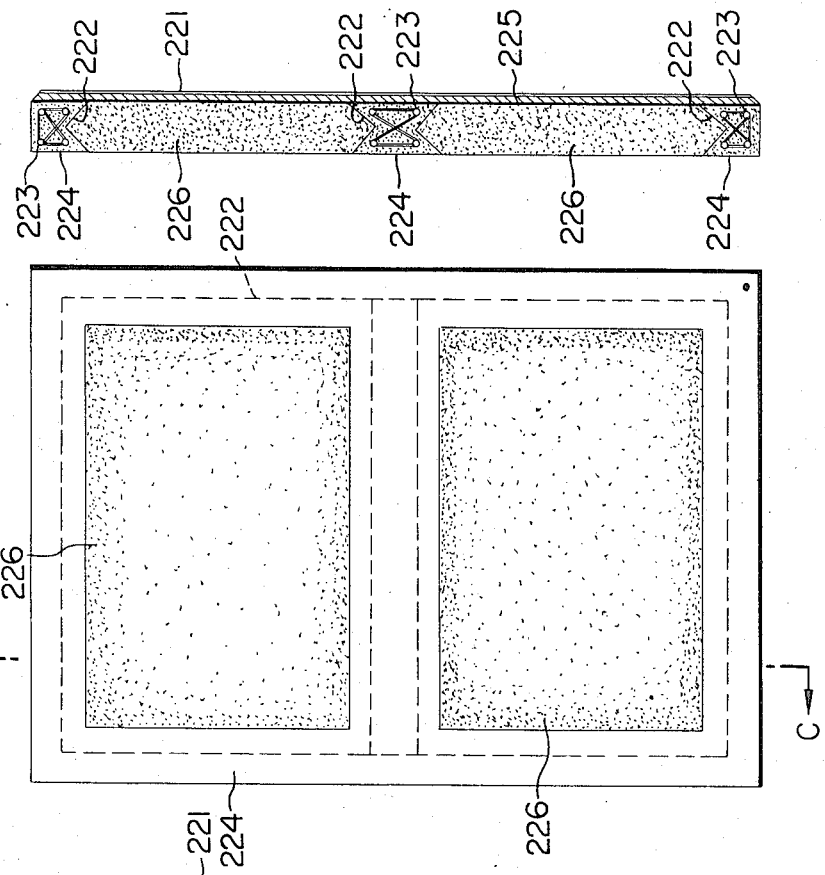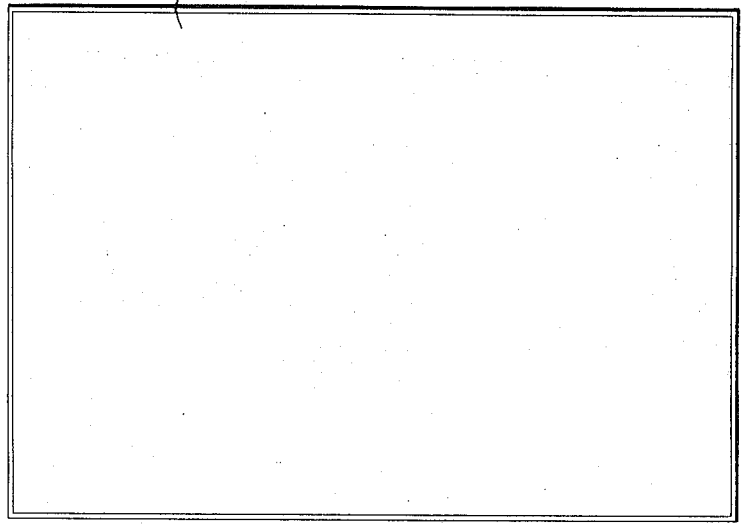

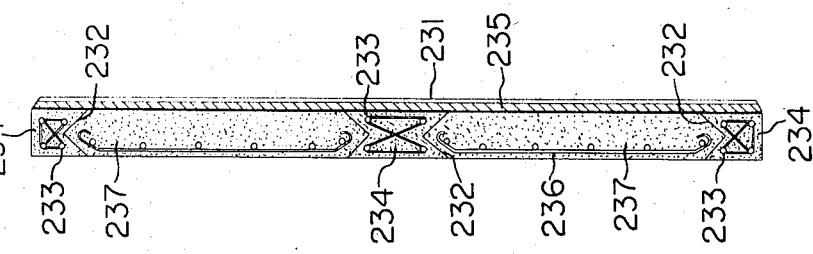
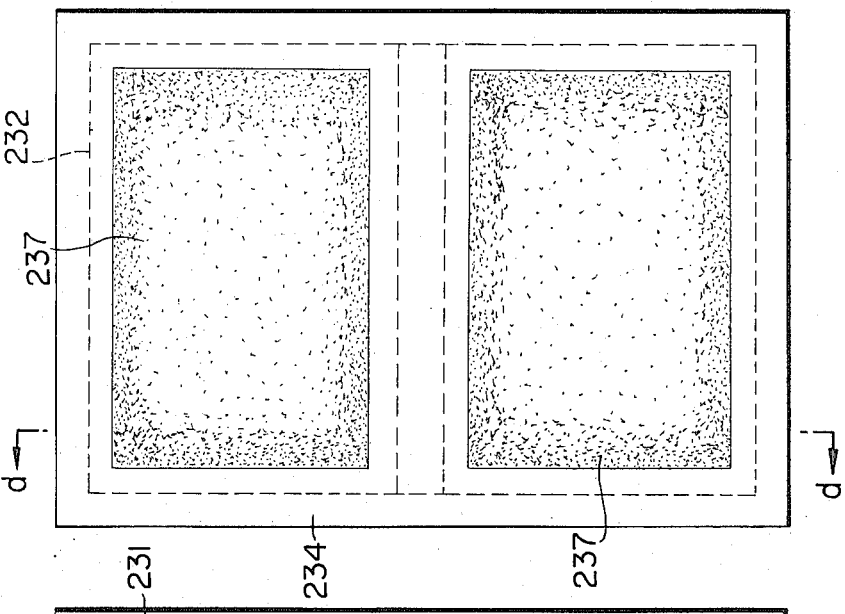
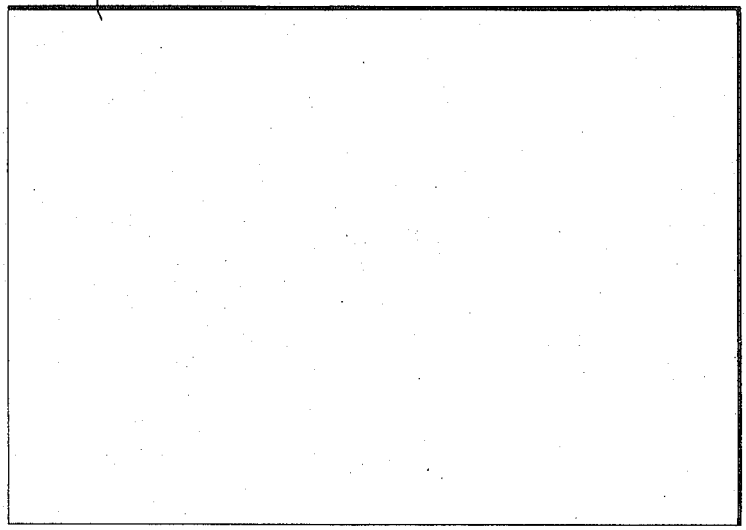

APPARATUS FOR MANUFACTURING A LIGHT-WEIGHT CONCRETE PANEL WITH PATTERN DESIGNS ON ITS SURFACE

BACKGROUND OF THE INVENTION

In producing, conventionally, a concrete plate with a surface-pattern, it is effected with manual handling of one sheet after another which lacks in mass-productivity and in uniformity of the concrete plate. Moreover, the conventional precast wall-type curtain wall is very heavy and its surface-finishing is mostly effected in the field of construction work.

SUMMARY OF THE INVENTION

The present invention has the purpose of obviating the above-mentioned disadvantages.

Therefore, the first object of this invention is the development of an apparatus which can realize the mechanical and automatic mass-production of concrete plates with surface patterns, such as a precast wall, precast slab, precast tile, etc.

The second object is the mass-production of light-weight concrete plates with surface patterns and either including or without reinforcing materials, and the easy transportation and easy mounting thereof.

The third object of this invention is the mass-production of concrete plates with patterns similar to original patterns by manual and automatic remote control operation.

For an understanding of the principles of the invention, reference is made to the following description of typical embodiments thereof as illustrated in the accompanying drawings.

BRIEF DESCRIPTION OF THE DRAWINGS

In the Drawings:

FIG. 4 is a perspective view showing the mechanism for extruding dyes;

FIG. 5 is a perspective view showing the injection mechanizm;

FIG. 11 is a partial perspective view of the molding form operating or control board therein;

FIG. 12 is a perspective view of the operating lever thereof;

FIGS. 17, 18 and 19 are a front view, a back view and a sectional view on line c—c of FIG. 18, respectively, of the product molded in the sixth embodiment of this invention;

FIGS. 20, 21 and 22 are a front view, a back view and a sectional view on line d-d of FIG. 21, respectively, of the product in the seventh embodiment.

DETAILED DESCRIPTION OF THE PREFERRED EMBODIMENTS

Figure 1:
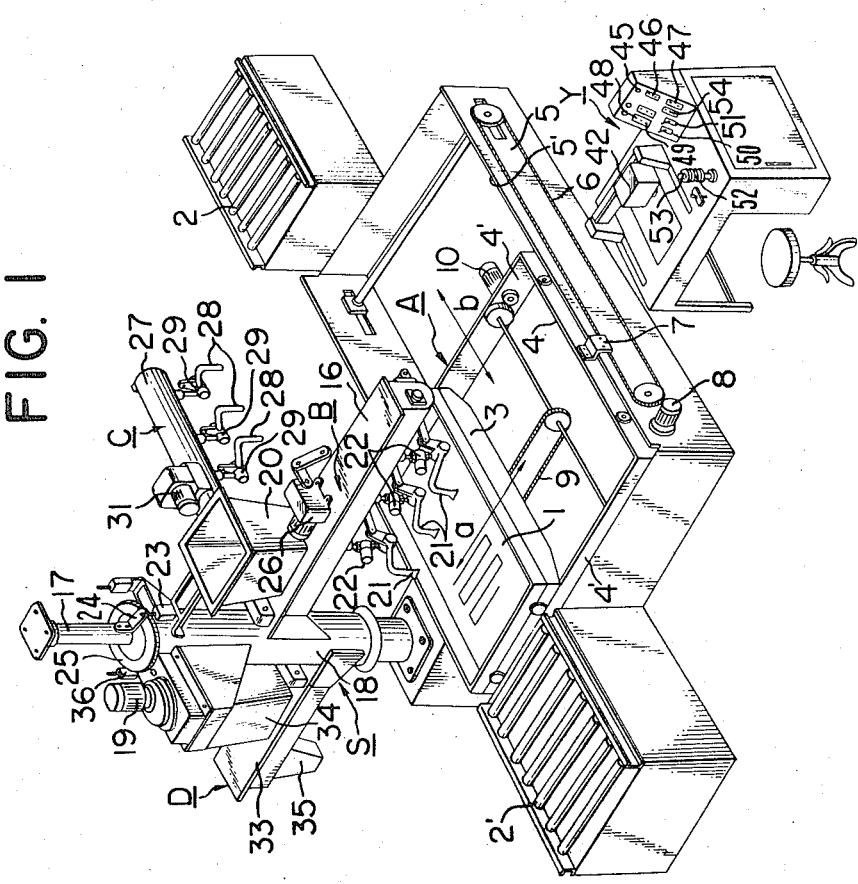
FIG. 1 is a perspective view showing a first embodiment of an apparatus for manufacturing concrete panels with patterns on surfaces according to this invention.

Each example of the apparatus for molding a concrete panel with figures on its surface according to this invention will hereinafter be described with reference to the drawings.

EXAMPLE 1

In FIGS. 1 – 6, this example can be roughly divided into two elements, of which one is the concrete-plate molding machine (S) and the other is the follower-type electric-lighting instruction board or control panel (Y) for operating said concrete plate molding machine. The concrete-plate-molding machine (S) comprises a molding form moving mechanism (A), which can slide the molding form in an arbitrary horizontal direction, a dyes introduction mechanism (B) for introducing dyes into the molding form, an air injection mechanism (C) for spreading, on the bottom of the molding form, the dyes introduced into the molding form, and a material introduction mechanism (D) for filling the material for the concrete plate over the spreaded dye. In said molding form moving mechanism, numeral 1 is a molding form, which moves on the conveyer 2 and then is placed on the carriage frame 3. The carriage frame 3 is slidable in the direction of an arrow (a) along the upper edge of the longer side 4' of the rectangular mobile frame 4 formed in a size nearly twice that of the molding frame 1. Moreover, rectangular frame 4 is slidable in the direction of an arrow (b) along the upper edge of the longer side 5' of the rectangular fixed frame 5 formed in a size nearly twice that of frame 4. Mobile frame 4, which is secured by means of the connecting fixture 7 to the endless chain 6 mounted on the lateral side of said fixed frame 5, is movable in the direction shown by the arrow (b) by endless chain 6 in accordance with the reversible driving action of the motor 8. Also, the carriage frame 3 is attached to the other endless chain 9 mounted within said movable frame 4, so that it nay be moved in the direction shown in accordance with an arrow owing by endless chain 9 by the reversible rotation of the motor 10.

Figure 2:
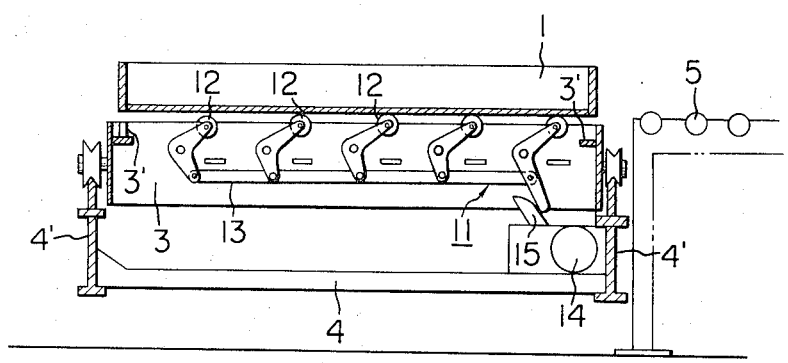
FIG. 2 is a side view showing the mechanism for vertical movement of the molding form for the concrete-plate.
Figure 3:
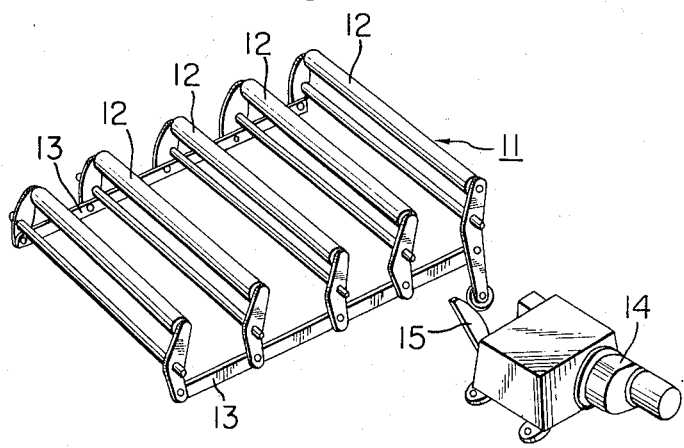
FIG. 3 is a perspective view of the apparatus of FIG. 2.

Further, in the movable frame 4, as shown in FIG. 2 and 3, there is disposed an acting mechanism 11 for vertically moving molding forms 1, this mechanism 11 having a number of rolls 12 for receiving the molding forms, each of which rolls is vertically moved at the same time by the arm 15 actuated by the motor 14 through the operating lever 13, and at the time of the rising of said rolls, the molding form 1 is pushed up from the surface of carriage frame 3 so that the molding form 1 may be carried to the next process. In the time of descending of each roll 12, molding frame 1 is engageably mounted on the edging rack portion 3' of carriage frame 3.

Figure 16:
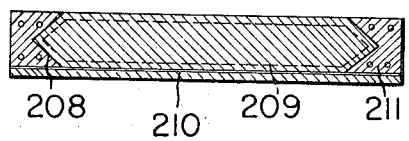
FIG. 16 is a vertical section of the product utilizing the above space-limiting plate.

The dye introducing mechanism B, as shown in FIG. 1 and FIG. 4, 16 is a horizontal arm secured to the rotating cylinder 18 which is rotatably supported by the fixed strut 17. This arm 16 can be rotated with rotary cylinder 18 by means of motor 19, and also the arm 16 is provided with a hopper 20, and three nozzles 21. The dyes filled in the hopper 20 are poured into molding form 1 by means of the action of a respective electromagnetic valve 22 provided for each of said nozzles 21. 23 is a limit switch for stopping the rotation of the dye introduction mechanism B. 24 is a limit switch operating element attached to fixed strut 17. 25 is a gear which is secured to rotating cylinder 18 and to which the torque of the motor 19 is transmitted. 26 is a motor for switching electro-magnetic valves 22.

In the air injection mechanism C, as shown in FIGS. 1 and 5, 27 is a horizontal arm secured to rotary cylinder 18. Air nozzles 28 are connected in parallel to arm 27. From those nozzles 28, air, which has been transmitted from the air inlet tube 30, may be discharged by the action of the electro-magnetic valves 29. 31 is a motor for switching said electro-magnetic valves 29, and 32 is a limit switch for regulating the stopping position of said arm.

In the material supplying mechanism D, as shown in FIG. 1, 33 is a horizontal arm secured to rotary cylinder 18, this arm 33 supporting material hopper 34 provided for the molding. The material contained in said hopper is supplied from the supplying outlet 35 by means of a screw conveyer (not shown) which is mounted within arm 33. 36 is a limit switch for stopping the material supplying mechanism C at the determined position (upper portion of the molding form).

Figure 6A:
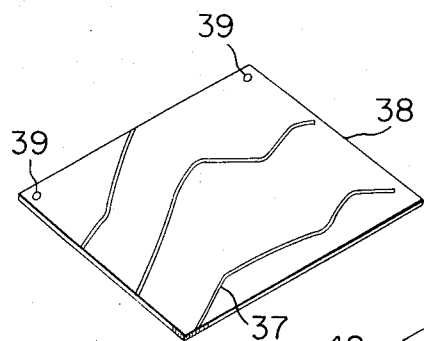
FIGS. 6(a), 6(b) and 6(c) are explanatory views of a follower-type electric-light instruction board or control panel.
Figure 6B:
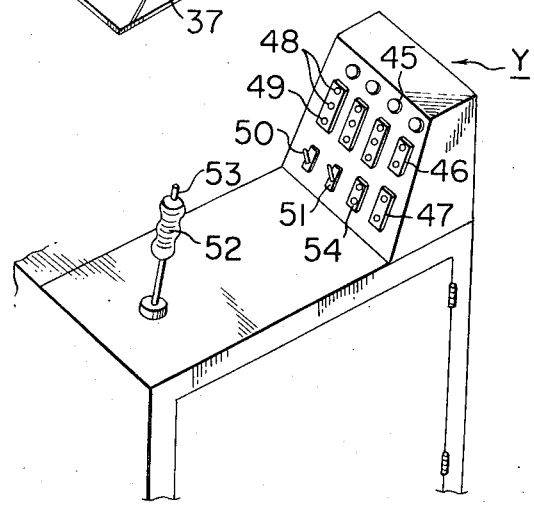
Figure 6C:
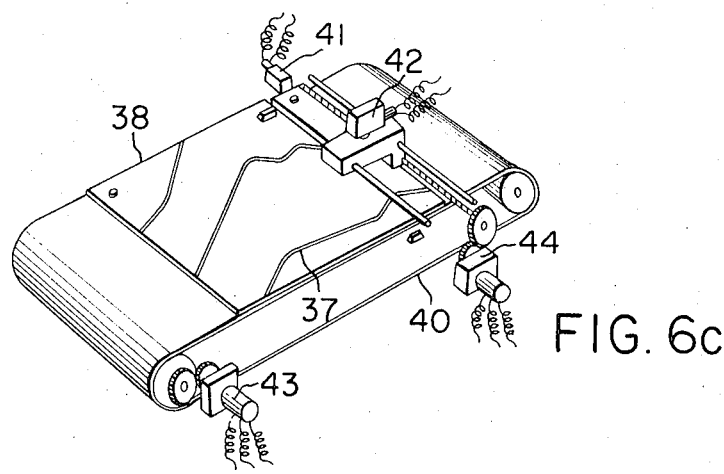

In the follower-type electric-lighting instruction board or control panel Y for operating the concrete plate molding machine, as shown in FIG. 6 (a) – (c), a pattern 37 is depicted and a conveyer 40 is provided which carries the original pattern 38 with the instruction mark 39. At the upper part of conveyer 40, the reflection photo-electric switching detector 41, for the frame carriage, and the electro-magnetic valve detector, for the introduction of dye 42, are provided.

43 is a reduction motor for longitudinal transmission and 44 is a reduction motor for lateral transmission. 45 is an operation indicating lamp, and 46 is a push button for the electric source. 47 is a switch for moving the frame. 48 is an on-off switch for the liquid introduction conveyer. 49 is an on-switch for the rotating cylinder. 50 is a switch for automatically changing the longitudinaly and lateral movement of the frame carriage. 51 is an automatic changing switch for the instruction device for the liquid introduction. 52 is a frame operating lever. 53 is a push button for the liquid introduction. 54 is a hand operating switch for the instruction device for the liquid introduction. Thus, upon introducing the dyes into the molding form 1 of the concrete plate molding machine S by operating instruction board Y, at first the push button for the electric source is operated, then automatic changing switch 50 for the longitudinal and lateral movement of the frame carriage and automatic changing switch 51 for the instruction device for liquid introduction, are switched to automatic operation. Then, the black line pattern 37 on the original pattern 38 is followed by the electric lighting-type instruction device 42, so as to move instruction device 42 itself to follow the pattern 37 of the original. The movement of said instruction device is amplified by a transistor, I.C. etc. so as to drive motor 8 and motor 10 to effect the longitudinal and lateral movement of the molding form 1. At the time of this movement of the molding form 1, if the dyes are introduced into molding form 1, the pattern 37 on master 38 will be reproduced in detail.

EXAMPLE II

Figure 7:
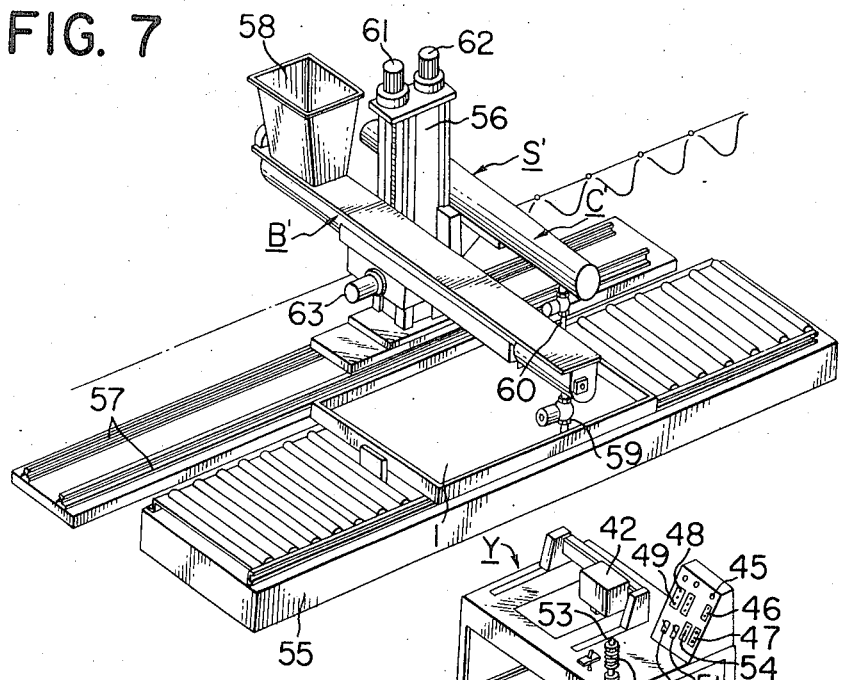
FIG. 7 is a perspective view showing the second embodiment of the concrete-panel-manufacturing apparatus.
Figure 8:
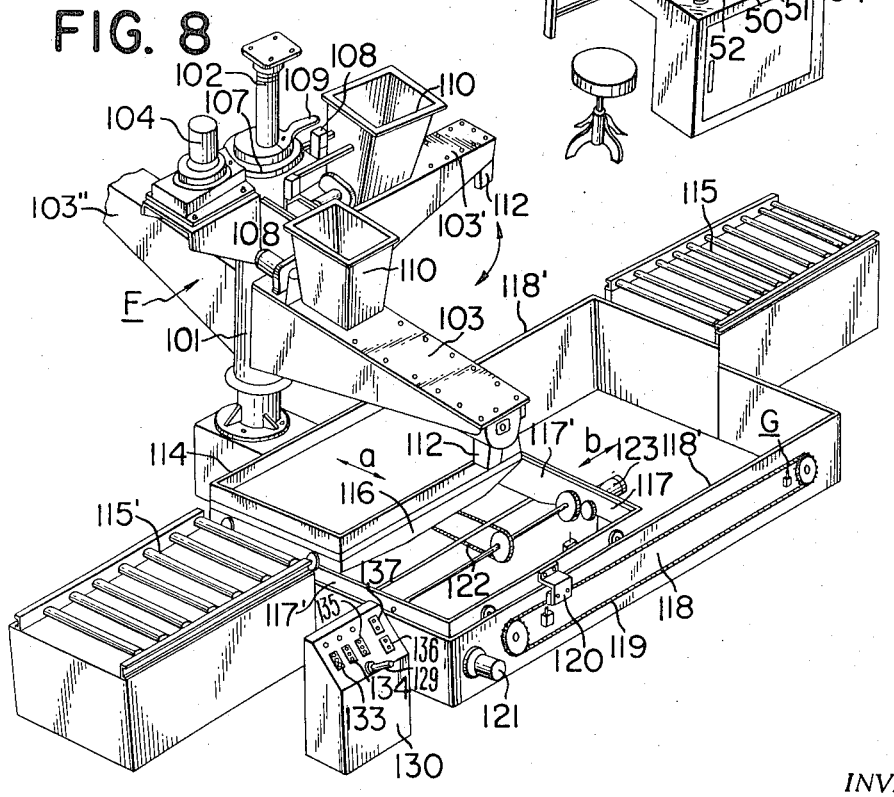
FIG. 8 is a perspective view showing the third embodiment thereof.
Figure 9:
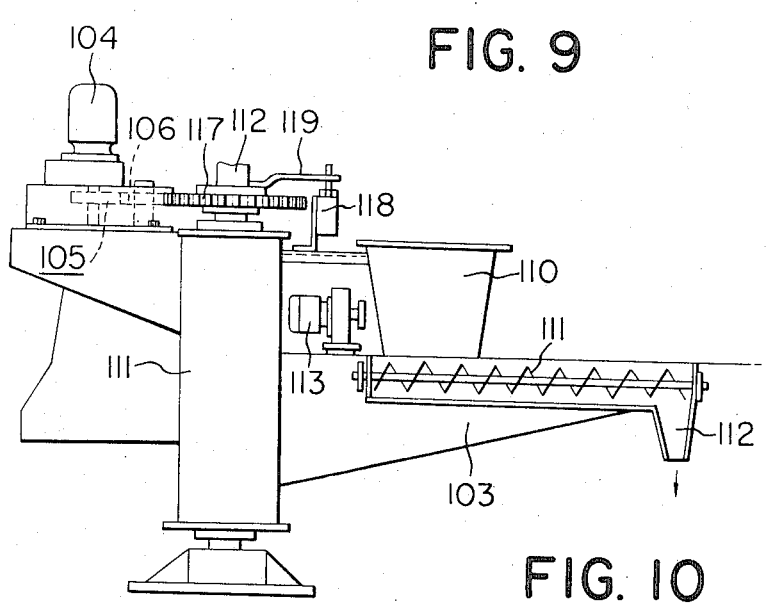
FIG. 9 is a side view of an apparatus for extruding concrete materials in the third embodiment.
Figure 10:
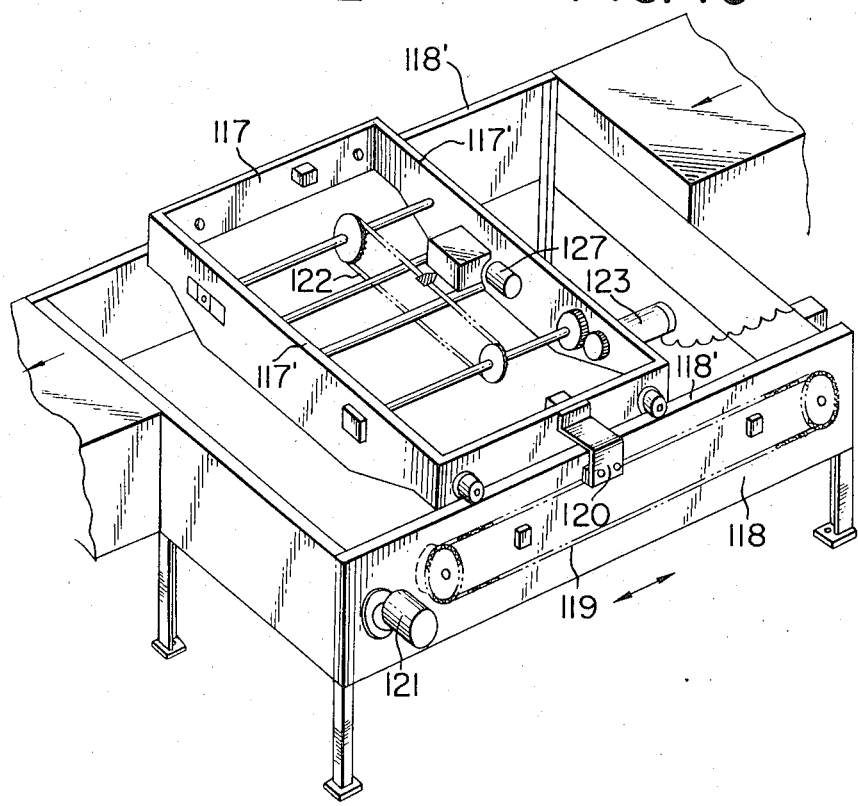
FIG. 10 is a perspective view of a molding-form moving carriage in the same embodiment as above.

In FIG. 7, a concrete plate molding machine S' is provided instead of the machine S as described in the former example I. In the concrete plate molding machine S', a rail 57 for moving the carriage 56 is provided, which rail is parallel to the roller conveyor 55 for transferring the molding form 1. On the carriage 56, the dye introducing hopper 58 and the dye supplying mechanism B' with nozzles 59, wherein the dyes in hopper 58 are supplied through a screw conveyor (not shown), and the air injection mechanism C' are carried. Dye supplying mechanism B' and air injection mechanism C' are so arranged as to be moved in the direction perpendicular to rail 57. 61 is a motor for up and down movement of the dye supplying mechanism. 62 is a motor for up and down movement of the air injection mechanism. 63 is a motor for the transverse motion of the carriage on the support frame.

In the concrete plate molding machine S' of this example, constructed as above, operated with the same follower-type electric lighting instruction board or control panel Y as mentioned in the former example 1, the carriage is moved transversely along the rail 57, and further the dye supplying mechanism B' is suitably moved, and the dye is introduced into the molding form 1 in order to extrude the dye in the desired pattern in the molding form 1. After this, with the operation of the air injection mechanism C', air is emitted on the dye having been extruded on the molding frame, and then the concrete plate with surface pattern can be molded by the same means as described in the example I.

EXAMPLE III

In FIGS. 8–12, the apparatus according to this example comprises the material introducing machine F and the molding frame transferring machine G in which the molding form, filled with the material from material introducing machine F, can be moved back and forth, right and left, and further up and down as occasion demands. Firstly, in material introducing machine F, numeral 101 is a rotary cylinder which is rotatably supported by the fixed strut 102. On the periphery of this rotating cylinder 101, horizontal arms 103, 103' and 103'' are provided. 104 is a power machine or motor secured to rotary cylinder 101. The driving gear 105 of said motor is engaged with the gear 107 secured to the fixed strut 102 through the reduction gear 106, and the rotary cylinder 101 is rotated by the driving force of motor 104. Elements 108 are limit switches for stopping the rotary cylinder 101 at desired positions, and these limit switches are actuated by the cam 109 secured to the strut 102. 110 are hoppers each of which is mounted on a respective arm. Each hopper 110 communicates with a screw conveyor 111 contained in the associated arm, and further the terminal end of each screw conveyor communicates with a supplying outlet 112 provided at the end of the associated arm 103, 103′, 103″. Thus, on rotating screw conveyor 111 by motor 113, the material in each hopper 110 is discharged from the respective supplying outlet 112.

In the molding form transferring machine G, 114 is a molding form into which the material supplied from discharge outlets 112 is introduced, and it moves along the conveyor 115 to be placed on the carriage frame 116. This carriage frame 116 is slidable in the direction as shown in arrow (a) along the upper edge of the longer side 117′ of the rectangular movable frame 117 which is formed with a size nearly twice that of the frame 114. Further the rectangular frame 117 is slidable in the direction shown by an arrow (b) along the upper edge of the longer side 118′ of the rectangular fixed frame 118 which is formed with a size nearly twice that of frame 117. Movable frame 117 is secured to endless chain 119 mounted on the lateral side of the fixed frame 118, through the connecting fixture 120, and it can be moved in the direction as shown by arrow (b), by means of the endless chain in accordance with the reversible driving of the motor 121. Carriage 116 is attached to the endless chain 122 mounted in the movable frame 117, and it can be moved in the direction shown by arrow (a) by the endless chain by the reversible driving of the motor 123.

Further, in the movable frame 117, for the purpose of effecting the up and down movement of the molding box 114, working mechanism (not shown), which is the same as the acting mechanism 11 in the Example I, is provided. In FIGS. 11 and 12, an operation board 130 of the above-mentioned concrete plate manufacturing machine and an operation lever 129 thereof are shown. By laterally moving operation lever 129, the limit switch 131 is actuated and the before-mentioned motor 121 is reversibly driven so that the movable frame 117 may be moved in the lateral direction (b). Also, by moving the operation lever 129 in the back and forth direction, the limit switch 132 is actuated and the above-mentioned motor 123 is reversibly driven so that the carriage frame 116 may be moved in the back and forth direction.

In the operation board 130, push button switches 133, 134, 135 are respectively provided and by operating any one of those switches, the before-mentioned rotary cylinder is suitably rotated to position the desired material supplying outlet 112 above the molding form 114. Then its screw conveyer 111 is actuated to introduce the material in the hopper into the molding form. In the same way, when another push button switch is operated, the rotary cylinder is rotated to position above the molding form 114 the material supplying outlet corresponding to the hopper filled with another kind of the material so that a different material may be filled within the molding form. 136 is a push button switch for up an down movement of the molding form. 137 is a switch for the electric source. The mechanism for the concrete plate manufacturing machine according to this Example has been described as above, and the function thereof will hereinafter be described.

Any one of push button switches 133, 134, 135 is actuated to position the desired material supplying outlet 112 above the molding form 114, and after this, the screw conveyer 111 is actuated to successively fill the molding form 114 with the material in the hopper.

At the time of said filling operation, by manipulating the operation lever 129 to move the molding form laterally and vertically, it is possible to fill the molding form 114 uniformly with the material over the whole form, or it is possible also to fill only the desired portion with the material. Also, the before-mentioned push-button switches 133, 134, 135 are suitably operated so as to position above the molding form 114 the desired supply outlet from which different kinds or different colors of material may be supplied and, by supplying such material, the molding form 114 is filled with different kinds of material to form the concrete plate with patterns on the surface. In this way, after the molding form has been filled with the material and a motor driven by means of the operation of switch 136, is activated the molding form 114 is pushed up by the working mechanism, to transfer molding form 114 along the conveyer 115′ to the next process.

The above-mentioned are examples of the concrete-plate manufacturing machine according to this invention, wherein by suitably operating the molding box and the material supplying machine with remote control, it is possible to make successive mass-production of concrete plates with patterns on their surfaces.

The concrete plate with a pattern on its surface which has been molded as above, is utilizable as a structural material as it is. However, it is also possible to produce the light-weight concrete panel containing reinforcing material or reinforced concrete panel, etc. by utilizing usch molded concrete panel as a primary product.

The examples of the method for producing the light-weight concrete panel containing reinforcing material will be explained in the following.

EXAMPLE IV

Figure 13:
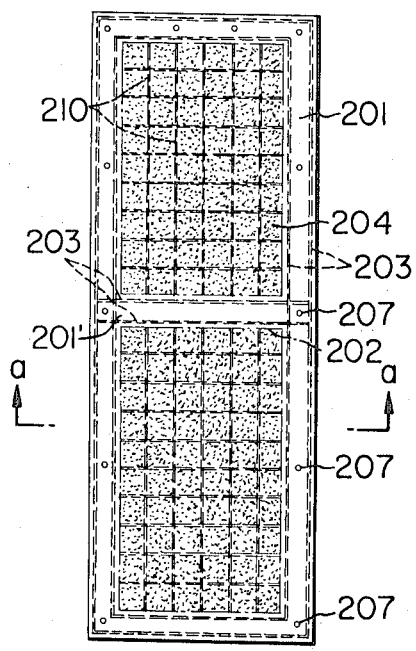
FIG. 13 is a plan view of the product in the fourth embodiment according to this invention.
Figure 14:
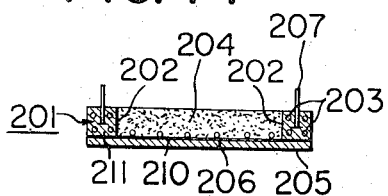
FIG. 14 is a sectional view taken along the line a—a of FIG. 13.

In FIG. 13 and FIG. 14, an appropriate pattern is depicted on the surface of the above-mentioned molding form, by using the surface-finishing material which comprises a different color cement on the cement mixed with a color material and pigment, to which mixture water glass, synthetic resin and cement dispersion material are added and further water and suitable aggregates (fine granular stone) are mixed.

Then, on the whole surface there is applied a mortar layer 206 for combining the colored material layer 205 formed as above and the light-weight center-filling material 204 which will be described in detail later. Upon such mortar layer, lath and iron mesh 210 is applied and after that the inner molding form 202 and steel bars 203 are arranged thereon.

Also, the connecting anchor bolts 207 are arranged, which are serviceable the metal fixtures on mounting the product as a curtain-wall member.

Then, after forming the ferro-concrete frames 201, 201′ by pouring the concrete for outer frame 211 between the inner molding frame 202 and the outer molding frame, inner temporary molding frame 202, while the light-weight inner filling materials such as foaming concrete, light-weight concrete or asphalt (containing asphalt concrete), etc. are being poured, is removed, and after this suitable curing may be effected to remove the form, so as to obtain a light-weight concrete panel with finished surface as a curtain wall structure with optional pattern on the surface.

EXAMPLE V

Figure 15:
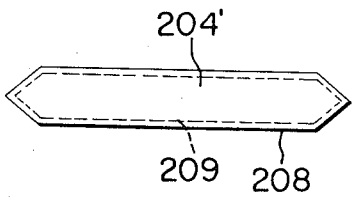
FIG. 15 is a side view of a light-weight space-limiting plate used in the fifth embodiment of this invention.

FIGS. 15 and 16 represent the example wherein the before-mentioned light-weight internal-filling material 204 is previously produced as a plate 204′, and this light-weight internal filling plate 204' has projections 208 on its lateral sides and lath or reinforcing iron 209 inside.

In the case of this example, after the outer molding form is placed on the small plain frame, the colored material layer 205 and the mortar layer thereover 206 are formed on this small plain frame, the before-mentioned light-weight internal filling plate 204' is placed at the predetermined position with the periphery of the outer molding box in place. Then the reinforced concrete frame 201 can be formed by filling the outer frame with dense concrete 211 between center-filling plate 204' and the outer molding form. Thereafter the product can be processed in the same way as above-mentioned.

It is understood, in the above description, that the projection 208 will not slide out nor be cracked since it is held by the reinforced concrete frame 201.

EXAMPLE VI

FIGS. 17 – 19 represent the example for manufacturing the concrete plate by combining a previously molded thin concrete plate with a concrete frame, wherein 221 is a thin concrete plate with a pattern on its surface and this thin plate 221 is one previously molded by the above-mentioned apparatus.

A reinforced rectangular concrete frame 224, having a concave groove in its inner surfaces, is secured on patterned plate 221 by an adhesive layer 225, concrete frame 224 having been previously molded in the peripheral shape matching the periphery of the above-mentioned patterned plate 221, and then the space defined by concrete frame 224 is filled with the concrete 226.

The concrete plate thus formed is a composite product consisting of a plate with a desired surface pattern 221, a grooved concrete frame 224 and a concrete mass 226, and further the surface thereof has applied thereto a finishing agent obtained by mixing cement with less than 5 percent of water glass and synthetic resin of the acryl group, and adding thereto, as a dispersion agent, alkyl-benzene sulfonic acid soda, to obtain a desirable surface of good finish.

EXAMPLE VII

FIGS. 20 – 22 represent the example wherein a reinforcing material is attached on the back side of concrete thin plate to make it a reinforced plate. 231 is a thin concrete plate with a surface pattern, which has previously been molded. On the back of thin concrete plate 231, there is placed a concrete frame 234, containing reinforcing material 233, which is secured to plate 231 by an adhesive layer 235. Frame 234 has previously been molded with a peripheral shape matching the periphery of thin plate 231. Then the space defined by concrete frame 234 is provided with iron reinforcement 236 and further is filled with the concrete 237 in order to imbed iron reinforcement 236 therein.

This formed concrete plate is also excellent in strength owing to such reinforcing material.

Moreover, the concrete panels according to the above-mentioned Example V, VI, and VII have great advantages in that, since the concaved groove is formed on the inside faces of each concrete frame, the concrete or the reinforcing material filled in the space defined by the concrete frame extends into and fills the groove so as to ensure a strong combination of the concrete and the concrete frame, and that the surface of said concrete panel can be neatly finished, as mentioned in the former example, so as to produce an effective concrete panel as a curtain wall and the like.

According to the apparatus of this invention as described above, any desired quantity of one and more kinds of concrete materials can be introduced through the whole of the molding form by means of the remote control by the operation lever and switches, whereby a concrete plates with a pattern on their surfaces can successively be mass-produced by a mechanical-electrical interlocking mechanism, and further, if a material with smooth and glossy surface, such as glass or plastics, is utilized as a bottom plate of the molding form, a surface layers similar to marble will be obtained and the layer over such surface layer will be filled with different kinds of materials in layers and reinforcement will be imbedded therein if desired, so that a concrete plate which is excellent in its strength and has a fine aspect is obtained.

Therefore, by utilizing thus obtained concrete thin plates with the surface pattern as primary products and by processing the secondary working thereon, it is possible to produce a precast wall, precast slab or precast tile, etc. with patterns on its surface, which will be light in weight and excellent in strength.

What we claim are:

1. Apparatus for manufacturing concrete plates, having patterns on a surface, for use as precast walls, precast slabs, tiles, etc., by depositing molding material, including concrete and pattern forming material, into a mold form, said apparatus comprising, in combination, conveyor means for a mold form; a mold form, for receiving molding material, including concrete and pattern forming material, movable on said conveyor means; upright pillar means adjacent said conveyor means; arms extending substantially horizontally from said pillar means for movement relative to said mold form; respective hoppers on at least certain of said arms for containing molding materials, including concrete and pattern forming material; respective material supplying outlets on said arms directed toward a mold form on said conveyor means to discharge thereinto; respective conveying means connecting each mold to the supplying outlet on the associated arm; respective discharge control means controlling discharge from said supplying outlet; electrically operable means actuable to effect relative displacement of the mold form and said supplying outlets; a control panel mounting a master pattern; pattern follower means on said control panel operable to trace said master pattern and including switch means operable to actuate said electrically operable means and said discharge control means in accordance with the traced pattern and in a predetermined sequence; said upright pillar means including a pillar rotatable about a substantially vertical axis; said electrically operable means including an electric motor operable to rotate said pillar; at least said arms having hoppers thereon containing concrete extending radially in angularly spaced relation from said rotatable pillar; and limit switch means associated with each of said last-named arms and controlling rotation of said pillar by said motor between a position in which the associated arm has its discharge outlet aligned with said mold form and a retracted position.

2. Apparatus for manufacturing concrete plates, having patterns on a surface, for use as precast walls, precast slabs, tiles, etc., by depositing molding material, including concrete and pattern forming material, into a mold form, said apparatus comprising, in combination, conveyor means for a mold form; a mold form, for receiving molding material, including concrete and pattern forming material, movable on said conveyor means; upright pillar means adjacent said conveyor means; arms extending substantially horizontally from said pillar means for movement relative to said mold form; respective hoppers on at least certain of said arms for containing molding materials, including concrete and pattern forming material; respective material supplying outlets on said arms directed toward a mold form on said conveyor means to discharge thereinto; respective conveying means connecting each mold to the supplying outlet on the associated arm; respective discharge control means controlling discharge from said supplying outlet; electrically operable means actuable to effect relative displacement of the mold form and said supplying outlets; a control panel mounting a master pattern; pattern follower means on said control panel operable to trace said master pattern and including switch means operable to actuate said electrically operable means and said discharge control means in accordance with the traced pattern and in a predetermined sequence; said conveyor means comprising an inlet conveyor and an outlet conveyor spaced longitudinally from said inlet conveyor; said mold form being substantially rectangular; said conveyor means further including a substantially rectangular mold form support interposed between said inlet and outlet conveyors and receiving the mold form from said inlet conveyor and delivering the mold form to said outlet conveyor; the longitudinal and lateral dimensions of said mold form support being at least twice the longitudinal and lateral dimensions of said mold form; and means operable, when said mold form is on said mold form support, to displace said mold form both longitudinally and laterally of said mold form support responsive to said pattern follower means.

3. Apparatus for manufacturing a concrete plate, as claimed in claim 2, including support means on said mold form support arranged to receive said mold form from said inlet conveyor and to lower said mold form onto said mold form support; said support means being operable to raise said mold form from said mold form support for transfer to said outlet conveyor.

* * * * *